(12) United States Patent
Hanada et al.

(10) Patent No.: US 10,424,931 B2
(45) Date of Patent: Sep. 24, 2019

(54) STORAGE BATTERY SYSTEM

(71) Applicant: TOSHIBA MITSUBISHI-ELECTRIC INDUSTRIAL SYSTEMS CORPORATION, Chou-ku (JP)

(72) Inventors: Masato Hanada, Tokyo (JP); Daisuke Tsurumaru, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 34 days.

(21) Appl. No.: 15/519,755

(22) PCT Filed: Oct. 27, 2014

(86) PCT No.: PCT/JP2014/078504
§ 371 (c)(1),
(2) Date: Apr. 17, 2017

(87) PCT Pub. No.: WO2016/067341
PCT Pub. Date: May 6, 2016

(65) Prior Publication Data
US 2017/0256945 A1    Sep. 7, 2017

(51) Int. Cl.
*H02J 3/32* (2006.01)
*H02J 7/04* (2006.01)
(Continued)

(52) U.S. Cl.
CPC .............. *H02J 3/32* (2013.01); *H02J 7/0047* (2013.01); *H02J 7/02* (2013.01); *H02J 7/042* (2013.01); *H02J 2007/005* (2013.01)

(58) Field of Classification Search
CPC .. H02J 3/32; H02J 7/0047; H02J 7/042; H02J 7/02; H02J 2007/005
See application file for complete search history.

(56) References Cited

U.S. PATENT DOCUMENTS

| 2011/0169459 A1* | 7/2011 | Chen | H02J 7/0057 |
| | | | 320/160 |
| 2014/0257585 A1 | 9/2014 | Kubota et al. | |
| 2015/0084416 A1* | 3/2015 | Nishibayashi | H02J 3/40 |
| | | | 307/12 |

FOREIGN PATENT DOCUMENTS

| JP | 2013-135482 A | 7/2013 |
| JP | 2014-124083 A | 7/2014 |

(Continued)

OTHER PUBLICATIONS

International Search Report dated Nov. 26, 2014 in PCT/JP2014/078504 filed Oct. 27, 2014.

(Continued)

*Primary Examiner* — Rexford N Barnie
*Assistant Examiner* — Thai H Tran
(74) *Attorney, Agent, or Firm* — Oblon, McClelland, Maier & Neustadt, L.L.P.

(57) ABSTRACT

A storage battery system relating to the present invention includes first and second PCSes. The first PCS performs charge and discharge to/from a first storage battery. The second PCS performs the charge and the discharge to/from a second storage battery. The second storage battery has a shorter service life than the first storage battery. A controllers controls the first and second PCSes on the basis of a charge/discharge request and storage battery information. The controller includes an SOC correction unit and a charge/discharge command unit. The SOC correction unit calculates SOCs of the first and second storage batteries, corrects the SOC of the second storage battery upwards in the case that the charge/discharge request is a charge request, and corrects the SOC of the second storage battery downwards in the case of a discharge request. The charge/discharge command unit determines charge/discharge commands so as to preferentially perform the charge from the storage battery of a low (Continued)

SOC in the case that the charge/discharge request is the charge request and to preferentially perform the discharge from the storage battery of a high SOC in the case of the discharge request.

1 Claim, 5 Drawing Sheets

(51) Int. Cl.
      *H02J 7/02*       (2016.01)
      *H02J 7/00*       (2006.01)

(56) References Cited

FOREIGN PATENT DOCUMENTS

| | | |
|---|---|---|
| JP | 2014-171335 A | 9/2014 |
| WO | 2012/111234 A1 | 8/2012 |
| WO | 2014/093162 A1 | 6/2014 |

OTHER PUBLICATIONS

Office Action dated Nov. 21, 2017 in Japanese Patent Application No. 2016-556063 (with unedited computer generated English translation).
International Preliminary Report on Patentability and Written Opinion dated May 11, 2017 in PCT/JP2014/078504.
Office Action dated Mar. 21, 2019 in Chinese Application No. 201480082999.7, along with a computer-generated English translation.
Office Action dated Jul. 17, 2019 in Indian Application No. 201717015691.

\* cited by examiner

STORAGE BATTERY SYSTEM

FIELD

The present invention relates to a storage battery system connected to a power system.

BACKGROUND

A power system is constructed by connecting power generation equipment and load equipment by a power transmission facility. There are power systems in various scales from a large-scale system connecting a plurality of large-scale power plants and many factories, commercial facilities and households to a small-scale system constructed within a specific facility. The power system of any scale includes an energy management system (EMS) that manages electric power supply/demand of the entire power system, and electric power supply by the power generation equipment and electric power demand by the load equipment are balanced by the EMS.

The storage battery system is connected to the power system described above, and used as a means for balancing the electric power supply/demand. It was thought before that it is difficult to store a large amount of power, however, since a storage battery of a large capacity such as a lithium-ion battery and sodium-sulfur battery is put into practical use, it is made possible to store the large amount of power. By connecting the storage battery system including such a storage battery to the power system, an operation is possible in which excess power is charged in the storage battery when supply is excessive in contrast with power demand, and power insufficiency is compensated by discharge from the storage battery when the supply is insufficient in contrast with the power demand.

One example of suitable uses of such a storage battery system is a combination with the power generation equipment utilizing natural energy such as sunlight and wind power. The power generation equipment utilizing the natural energy is being widely introduced in response to rise in awareness of energy problems or environmental problems in recent years. However, the power generation equipment utilizing the natural energy has a disadvantage that power cannot be stably supplied since generated power tends to be controlled by natural factors such as seasons and weather. The storage battery system is a system capable of making up for the disadvantage, and by combining the storage battery system with the power generation equipment utilizing the natural energy, the power can be stably supplied.

In the case of connecting the storage battery system to the power system, an operation of the storage battery system is managed by the above-described EMS. The storage battery system includes a power conditioning system (PCS) connected to a storage battery. The PCS has a function of converting AC power of the power system to DC power and charging the DC power to the storage battery and a function of converting the DC power of the storage battery to the AC power and discharging the AC power to the power system. A charge/discharge request is supplied from the EMS to the PCS and the PCS is operated according to the charge/discharge request so that power reception from the power system to the storage battery or discharge from the storage battery to the power system is achieved. Note that the charge/discharge request supplied from the EMS to the PCS is determined so as to balance the electric power supply/demand in the entire power system.

Note that the applicant recognizes a literature described below as the one associated with the present invention. In FIG. 1 of JP 2014-124063 A, one example of the storage battery system including a plurality of PCSes connected to a power system is drawn.

CITATION LIST

Patent Literature

[PTL 1] JP 2014-124063 A

SUMMARY

Technical Problem

Now, due to scale increase and diversification of a storage battery system, storage batteries of different makers are sometimes used among PCSes. When the makers are different, service lives of the storage batteries vary. In such a storage battery system, when the same charge/discharge command is issued to the individual PCSes, the storage battery of a shorter service life deteriorates early and the service life runs out. When the service life of some storage batteries runs out, the maximum charge/discharge amount as the entire storage battery system also declines. Therefore, it is desirable to perform operations such that degrees of the deterioration of the individual storage batteries become equal.

The present invention is implemented in order to solve the above-described problem, and an object is to provide a storage battery system capable of managing charge/discharge such that time to replace the individual storage batteries becomes the same time by making the storage battery of a long service life perform more charge/discharge, in the storage battery system in which the service lives of the storage batteries are different among the PCSes.

Solution to Problem

In order to achieve the above-described object, a storage battery system relating to an embodiment of the present invention is configured as follows.

The storage battery system relating to the embodiment of the present invention is connected to a power system and is configured to be operated on the basis of charge/discharge requests from an EMS that manages electric power supply/demand of the power system. A scale and a configuration of the power system to which the storage battery system relating to the embodiment of the present invention is connected are not limited.

The storage battery system relating to the embodiment of the present invention includes a first storage battery, a second storage battery, a first battery management unit, a second battery management unit, a first PCS, a second PCS, and a controller. The number of the storage batteries, the number of the battery management units and the number of the PCSes may be three or larger.

The first and second storage batteries may be configured by a single storage battery module, or may be configured by connecting a plurality of storage battery modules in parallel. The storage battery module may be configured by a single storage battery cell, or may be configured as an assembly of a plurality of storage battery cells. As a kind of the storage battery, the storage battery of a large capacity such as a lithium-ion battery, a sodium-sulfur battery or a nickel-hydrogen battery is preferable. The second storage battery has a shorter service life than the first storage battery. The service life is based on specifications of the storage battery. The service life is sometimes indicated by the number of cycles. The number of cycles is an index indicating for how many cycles charge/discharge can be performed while one cycle is performing charge to a full charge state and then performing discharge to an empty state.

The first and second battery management units are devices that monitor a state of the storage battery. One battery management unit may be provided for the storage battery, or one battery management unit may be provided for the storage battery module. Examples of monitoring items by the battery management unit are state amounts of a current, a voltage and a temperature or the like. The battery management unit measures the state amount which is the monitoring item at all times or in a predetermined cycle by a sensor, and outputs a part or all of obtained data to outside as storage battery information.

The first and second PCSes are devices that connect the storage battery to the power system, and have a function of converting AC power of the power system to DC power and charging the DC power to the first and second storage batteries, and a function of converting the DC power of the first and second storage batteries to the AC power and discharging the AC power to the power system. The PCS is also referred to as a power conditioner, and a charge power amount to the storage battery and a discharge power amount from the storage battery are adjusted by the PCS.

The controller is a device interposed between an EMS and the first and second PCSes. The controller receives charge/discharge requests supplied from the EMS to the storage battery system. The controller is configured to receive storage battery information supplied from the first and second battery management units together with the charge/discharge requests and control the first and second PCSes on the basis of the charge/discharge requests and the storage battery information.

The controller includes an SOC (State Of Charge) correction unit and a charge/discharge command unit. The SOC correction unit calculates SOCs of the first and second storage batteries on the basis of the storage battery information, corrects the SOC of the second storage battery upwards in the case that the charge/discharge request is a charge request, and corrects the SOC of the second storage battery downwards in the case that the charge/discharge request is a discharge request. Note that the SOC means a charge rate to full charge of the storage battery.

The charge/discharge command unit determines charge/discharge commands to the first and second PCSes so as to preferentially perform the charge from the storage battery of a low SOC in the case that the charge/discharge request is the charge request and to preferentially perform the discharge from the storage battery of a high SOC in the case that the charge/discharge request is the discharge request.

Note that, in the storage battery system including three or more PCSes, for arbitrary two of the three storage batteries, the storage battery of a relatively long service can be considered as the first storage battery, and the storage battery of a short service life can be considered as the second storage battery.

Advantageous Effects of Invention

According to the storage battery system relating to the embodiment of the present invention, in the storage battery system in which the service lives of the storage batteries are different among the PCSes, the charge/discharge can be managed such that time to replace the individual storage batteries becomes the same time by making the storage battery of a long service life perform more charge/discharge.

DESCRIPTION OF EMBODIMENTS

Hereinafter, an embodiment of the present invention will be described in details with reference to the drawings. Note that same signs are attached to elements in common in the respective diagrams and redundant descriptions are omitted.

Embodiment 1

[Entire Configuration of Embodiment 1]

Figure 1:
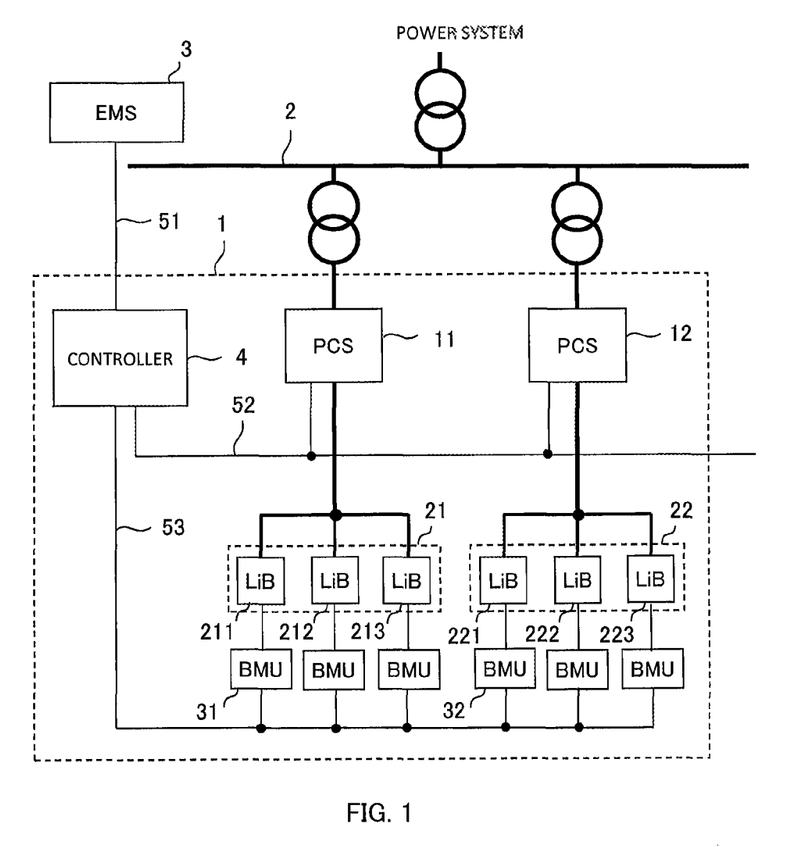
FIG. 1 is a conceptual configuration diagram for describing a system configuration relating to an embodiment 1 of the present invention.

FIG. 1 is a conceptual configuration diagram for describing a system configuration relating to the embodiment 1 of the present invention. A storage battery system 1 illustrated in FIG. 1 is connected to a power transmission facility 2 of a power system. The power system includes, other than the power transmission facility 2, power generation equipment (omitted in the figure) connected to the power transmission facility 2, and load equipment (omitted in the figure) connected to the power transmission facility 2. The storage battery system 1 is connected to a remote energy management system (hereinafter, EMS) 3 by a computer network 51. The EMS 3 manages electric power supply/demand of the power system such as a power generation amount of the power generation equipment, a charge/discharge amount of the storage battery system 1, and a power reception amount of the load equipment.

The storage battery system 1 includes a first power conditioning system (hereinafter, PCS) 11, a second PCS 12, a first storage battery 21, a second storage battery 22, a first battery management unit (hereinafter, BMU) 31, a second BMU 32, and a controller 4.

The storage battery system 1 includes the plurality of PCSes. Hereinafter, in order to facilitate descriptions, a group configured by one PCS, the storage battery connected to the PCS and the BMU is referred to as a "PCS group". Since basic configurations of the individual PCS groups are similar, here, a first PCS group is exemplified and described. Note that, in FIG. 1, two PCS groups are plotted, however, there may be three or more PCS groups.

The first PCS group includes a first PCS 11. The first PCS 11 is connected to the first storage battery 21. The first storage battery 21 is formed by connecting storage battery modules 211-213 in parallel. In FIG. 1, there are three columns of the storage battery modules, but it is just one example. A parallel number of the storage battery modules is determined on the basis of specifications of the PCS.

Therefore, it is possible that the parallel number of the storage battery modules is one.

Each of the individual storage battery modules 211-213 is a module in which a plurality of cells are connected in series. Each cell is a lithium-ion battery (LiB). Note that, in the first storage battery 21, the maximum power storage capacities and the service lives (the numbers of cycles) of the storage battery modules 211-213 are the same.

The storage battery modules 211-213 are connected to the first BMU 31 by a signal line. The first BMU 31 is connected to the controller 4 by a computer network 53. In FIG. 1, one BMU is connected to one storage battery module, but it is just one example. One BMU may be connected to the storage battery.

The first BMU 31 monitors a state of the first storage battery 21. Specifically, the first BMU 31 includes a current sensor, a voltage sensor, and a temperature sensor as means for measuring a state amount of the storage battery modules 211-213. A current flowing to the storage battery modules 211-213 is measured by the current sensor. A voltage of the storage battery modules 211-213 is measured by the voltage sensor. And, a temperature of the storage battery modules 211-213 is measured by the temperature sensor. The storage battery modules 211-213 are regularly monitored by the first BMU 31. However, regular monitoring in the present embodiment is a concept including not only an operation of fetching continuous signals without an interval from a sensor but also an operation of fetching the signals of the sensor in a predetermined short cycle. The first BMU 31 transmits storage battery information including information obtained by measurements by the respective sensors to the controller 4.

The first storage battery 21 connected to the first PCS 11 and the first BMU 31 are described above, and the above-described basic configuration is similar also for the second storage battery 22 connected to the second PCS 12 and the second BMU 32. An important difference is a point that a service life of the storage battery of at least one group among the plurality of PCS groups is different from a service life of the storage battery of the other groups. The service life is based on the specifications of the storage battery. The service life may be indicated by the number of cycles. In the present embodiment, it is assumed that the second storage battery 22 has a shorter service life than the first storage battery 21.

The controller 4 includes a memory including a ROM and a RAM or the like for example, an input/output interface that inputs and outputs various kinds of information, and a processor capable of executing various kinds of arithmetic processing on the basis of the various kinds of information. The controller 4 is connected to the EMS 3 by the computer network 51, to the first BMU 31 and the second BMU 32 by the computer network 53, and to the first PCS 11 and the second PCS 12 by a computer network 52.

The controller 4 plays a role of a controller that issues charge/discharge commands to the first PCS 11 and the second PCS 12. As one example, the controller 4 receives a charge/discharge request transmitted from the EMS 3 and the storage battery information transmitted from the first BMU 31 and the second BMU 32. The charge/discharge request includes a request regarding effective power and reactive power to be charged and discharged to/from the first PCS 11 and the second PCS 12. The controller 4 determines charge/discharge commands (corresponding to a charge/discharge amount [kW]) for the first PCS 11 and the second PCS 12 on the basis of the charge/discharge request and the storage battery information, and transmits them to the first PCS 11 and the second PCS 12. In addition, the controller 4 also has a function of outputting a trip command to the first PCS 11 and the second PCS 12 or the like.

The first PCS 11 is connected to the power transmission facility 2 by a power transmission line through a transformer. The first PCS 11 has a charge function of converting AC power of the power system to DC power and charging the DC power to the first storage battery 21, and a discharge function of converting the DC power of the first storage battery 21 to the AC power and discharging the AC power to the power system. A charge power amount to the first storage battery 21 and a discharge power amount from the first storage battery 21 are adjusted by the first PCS 11. The charge/discharge power amounts are adjusted by the first PCS 11 according to charge/discharge instructions supplied from the controller 4. The second PCS 12 also has a function similar to that of the first PCS 11.

[Characteristic Configuration of Embodiment 1]

Figure 2:
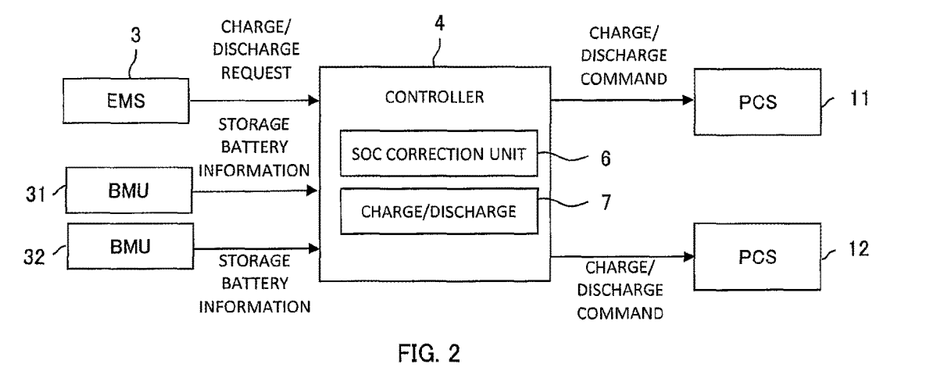
FIG. 2 is a block diagram of a system relating to the embodiment 1 of the present invention.

FIG. 2 is a block diagram of a system relating to the embodiment 1 of the present invention. Inside a block indicating the controller 4 in FIG. 2, a part of various functions that the controller 4 has is expressed by a block. An arithmetic resource is allocated to the block. Programs corresponding to the blocks are prepared in the controller 4, and by executing them by the processor, the functions of the blocks are realized in the controller 4.

(SOC Correction Function)

The controller 4 has an SOC correction function, and an SOC correction unit 6 is in charge of the function. The SOC correction unit 6 calculates the SOCs of the first storage battery 21 and the second storage battery 22 on the basis of the storage battery information, corrects the SOC of the second storage battery 22 upwards in the case that the charge/discharge request is the charge request, and corrects the SOC of the second storage battery 22 downwards in the case that the charge/discharge request is the discharge request.

Specifically, the SOC correction unit 6 calculates the SOC from an integrated value of the current flowing to the storage battery included in the storage battery information. In addition, the SOC means a charge rate to full charge. The SOC correction unit 6 calculates the SOCs of the first storage battery 21 and the second storage battery 22.

Further, the SOC correction unit 6 corrects the SOC of the second storage battery 22 upwards in the case that the charge/discharge request is the charge request. For example, +α is added to a calculated value of the SOC of the second storage battery. The value a is a predetermined setting value. For example, α is a setting value set beforehand on the basis of a difference in the service life between the first storage battery 21 and the second storage battery 22. In addition, the SOC correction unit 6 corrects the SOC of the second storage battery 22 downwards in the case that the charge/discharge request is the discharge request. For example, −α is added to the calculated value of the SOC of the second storage battery.

(Charge/Discharge Command Function)

The controller 4 has a charge/discharge command function, and a charge/discharge command unit 7 is in charge of the function. The charge/discharge command unit 7 determines the charge/discharge commands for the first PCS 11 and the second PCS 12 so as to preferentially perform the charge from the storage battery of the low SOC in the case that the charge/discharge request is the charge request and to preferentially perform the discharge from the storage battery of the high SOC in the case that the charge/discharge request is the discharge request.

Specifically, in the case that the charge/discharge request is the charge request, the SOC of the second storage battery 22 is corrected upwards by the SOC correction unit 6. As a result, in the case that the SOC of the first storage battery 21 is lower than the SOC of the second storage battery 22, in the charge/discharge command unit 7, the charge is preferentially performed from the first storage battery 21 of the low SOC. Therefore, the charge amount of the first storage battery 21 becomes larger compared to the charge amount of the second storage battery 22.

In addition, in the case that the charge/discharge request is the discharge request, the SOC of the second storage battery 22 is corrected downwards by the SOC correction unit 6. As a result, in the case that the SOC of the first storage battery 21 is lower than the SOC of the second storage battery 22, in the charge/discharge command unit 7, the discharge is preferentially performed from the first storage battery 21 of the high SOC. Therefore, the discharge amount of the first storage battery 21 becomes larger compared to the discharge amount of the second storage battery 22.

In this way, the charge/discharge amounts of the first storage battery 21 of the long service life can be increased, and the charge/discharge amounts of the second storage battery 22 of the short service life can be reduced. By making the storage battery of the long service life perform more charge/discharge, degrees of deterioration of the individual storage batteries can be made equal, and time to replace the individual storage batteries can be turned to the same time.

Figure 3:
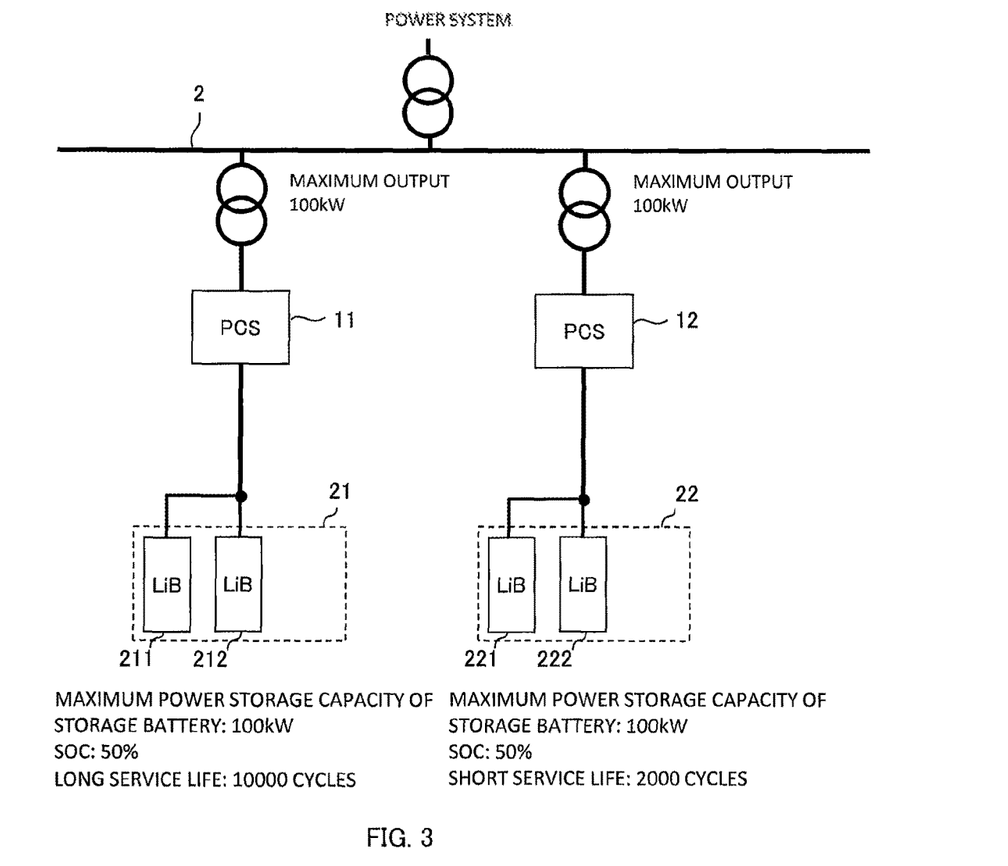
FIG. 3 is a diagram for describing a specific calculation example by a charge/discharge command unit 7 in the embodiment 1 of the present invention.

One example of specific control by the SOC correction function and the charge/discharge command function described above will be described. FIG. 3 is a diagram for describing a specific control example by the SOC correction function and the charge/discharge command function in the embodiment 1 of the present invention.

The storage battery system 1 illustrated in FIG. 3 includes two PCSes. The maximum output of the first PCS 11 is 100 [kW], and the maximum output of the second PCS 12 is 100 [kW]. The parallel number of the storage battery modules connected to the first PCS 11 is 2, and the parallel number of the storage battery modules connected to the second PCS 12 is 2. The maximum power storage capacity of each storage battery module is 100 [kW]. In addition, the service life of the storage battery modules 211 and 212 of the first storage battery 21 is 10000 cycles, and the service life of the storage battery modules 221 and 222 of the second storage battery 22 is 2000 cycles.

In FIG. 3, the SOC correction unit 6 calculates the SOCs of the first storage battery 21 and the second storage battery 22 on the basis of the storage battery information. It is assumed that the calculated SOCs are both 50[%].

Next, the SOC correction unit 6 adds +α[%] to the SOC of the second storage battery 22 in the case that the charge/discharge request is the charge request. For example, it is assumed that α=10. Therefore, the SOC after correction of the second storage battery 22 is 60[%]. Then, the charge/discharge command unit 7 sets the charge amount to the first storage battery 21 of the low SOC to be larger than the charge amount to the second storage battery 22, so as to preferentially perform the charge from the first storage battery 21 of the low SOC.

In addition, the SOC correction unit 6 adds −α[%] to the SOC of the second storage battery 22 in the case that the charge/discharge request is the discharge request. For example, it is assumed that α=10. Therefore, the SOC after the correction of the second storage battery 22 is 40[%]. Then, the charge/discharge command unit 7 sets the discharge amount from the first storage battery 21 of the high SOC to be larger than the discharge amount from the second storage battery 22, so as to preferentially perform the discharge from the first storage battery 21 of the high SOC.

By such control, the charge/discharge amount of the first storage battery of the long service life can be increased, and the charge/discharge amount of the storage battery of the short service life can be reduced.

(Flowchart)

Figure 4:
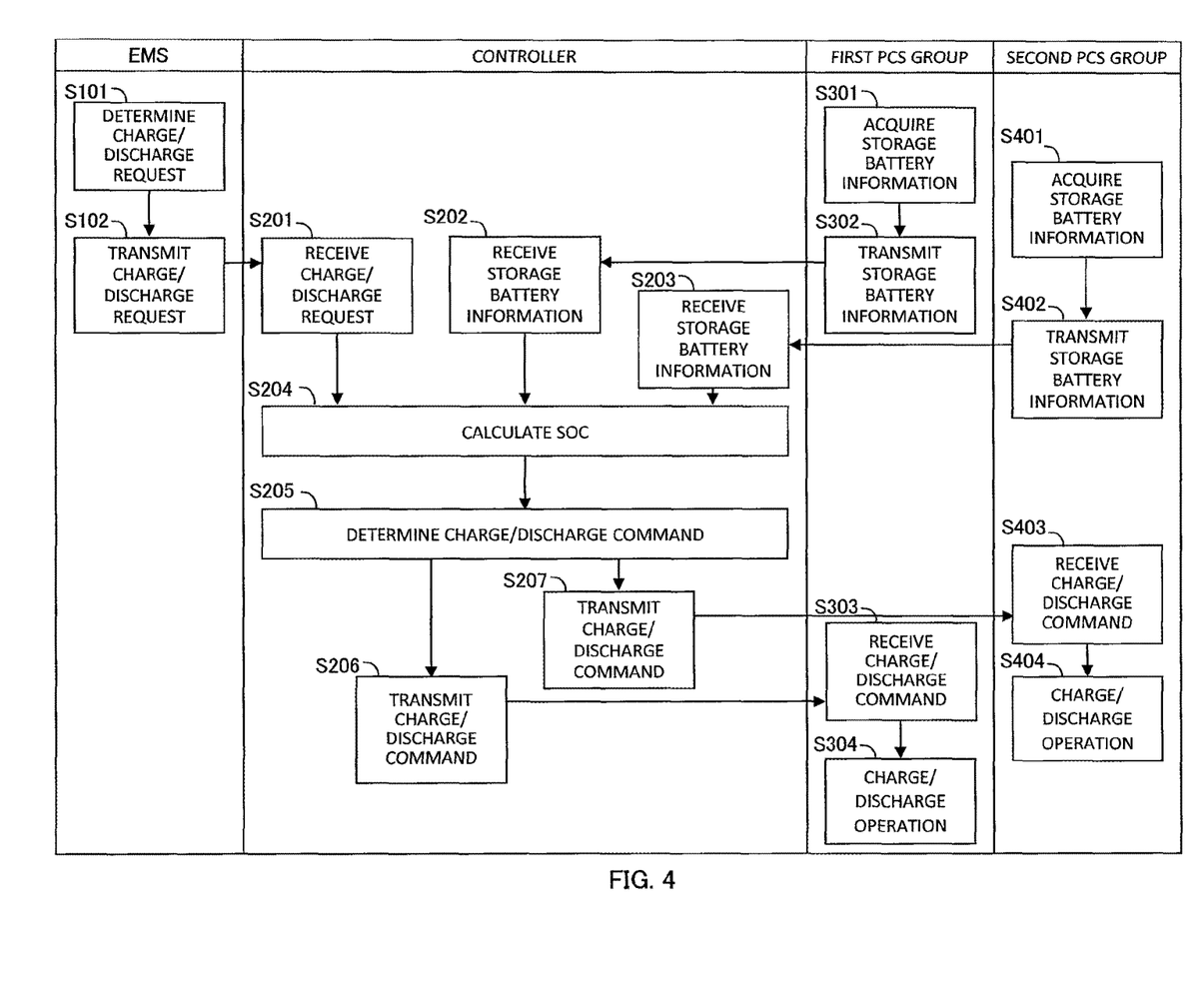
FIG. 4 is a flowchart of a control routine executed by storage battery system 1, in order to realize charge/discharge control based on charge/discharge requests from an EMS 3.

FIG. 4 is a flowchart of a control routine executed by the storage battery system 1, in order to realize charge/discharge control based on the charge/discharge request from the EMS 3. Processing of the controller 4 illustrated in the flowchart is processing realized by the functions of the SOC correction unit 6 and the charge/discharge command unit 7. The program that executes the processing in the flowchart illustrated in FIG. 4 is stored in the memory of the controller 4, and by reading and executing the program by the processor of the controller 4, the processing illustrated in FIG. 4 is realized.

In the routine illustrated in FIG. 4, first, the EMS 3 determines the charge/discharge request for the storage battery system 1 so as to balance the demand and supply of the power in the power system (step S101). The EMS 3 transmits the determined charge/discharge request to the controller 4 (step S102).

In the first PCS group, the first BMU 31 regularly acquires the storage battery information using the various kinds of sensors (step S301). Thereafter, the first BMU 31 transmits the acquired storage battery information to the controller 4 (step S302).

In a second PCS group, the second BMU 32 regularly acquires the storage battery information using the various kinds of sensors (step S401). The second PCS group is a group including the second PCS 12, the second storage battery 22, and the second BMU 32. Thereafter, the second BMU 32 transmits the acquired storage battery information to the controller 4 (step S402).

The controller 4 receives the charge/discharge request transmitted from the EMS 3 (step S201). In addition, the controller 4 receives the storage battery information transmitted from the first BMU 31 of the first PCS group (step S202). Similarly, the controller 4 receives the storage battery information transmitted from the second BMU 32 of the second PCS group (step S203).

The controller 4 calculates the SOC of the first storage battery 21 and the SOC after the correction of the second storage battery 22, on the basis of the charge/discharge request received in step S201 and the storage battery information received in steps S202 and S203 (step S204). A method of calculating the SOC executed in step S204 is as described in the description of the SOC correction function.

Thereafter, the controller 4 determines the charge/discharge commands for the first PCS 11 and the second PCS 12 (step S205). A method of determining the charge/discharge command executed in step S205 is as described in the description of the charge/discharge command function.

Thereafter, the controller 4 transmits the charge/discharge command for the first PCS group to the first PCS 11 (step S206). Similarly, the controller 4 transmits the charge/discharge command for the second PCS group to the second PCS 12 (step S207).

In the first PCS group, the first PCS 11 receives the charge/discharge command transmitted from the controller 4 (step S303). The first PCS 11 executes a charge/discharge operation according to the charge/discharge command (step S304).

Similarly, in the second PCS group, the second PCS 12 receives the charge/discharge command transmitted from the controller 4 (step S403). The second PCS 12 executes the charge/discharge operation according to the charge/discharge command (step S404).

As described above, according to the storage battery system 1 of the present embodiment, in the storage battery system in which the service lives of the storage batteries are different among the PCSes, the charge/discharge can be managed such that the time to replace the individual storage batteries becomes the same time by making the storage battery of the long service life perform more charge/discharge. Therefore, the storage battery system 1 is highly extensible at a point that the storage batteries of the different service lives can be used, and is highly stable since the operation can be performed with the maximum charge/discharge amount until the time of replacement.

(Modification)

Figure 5:
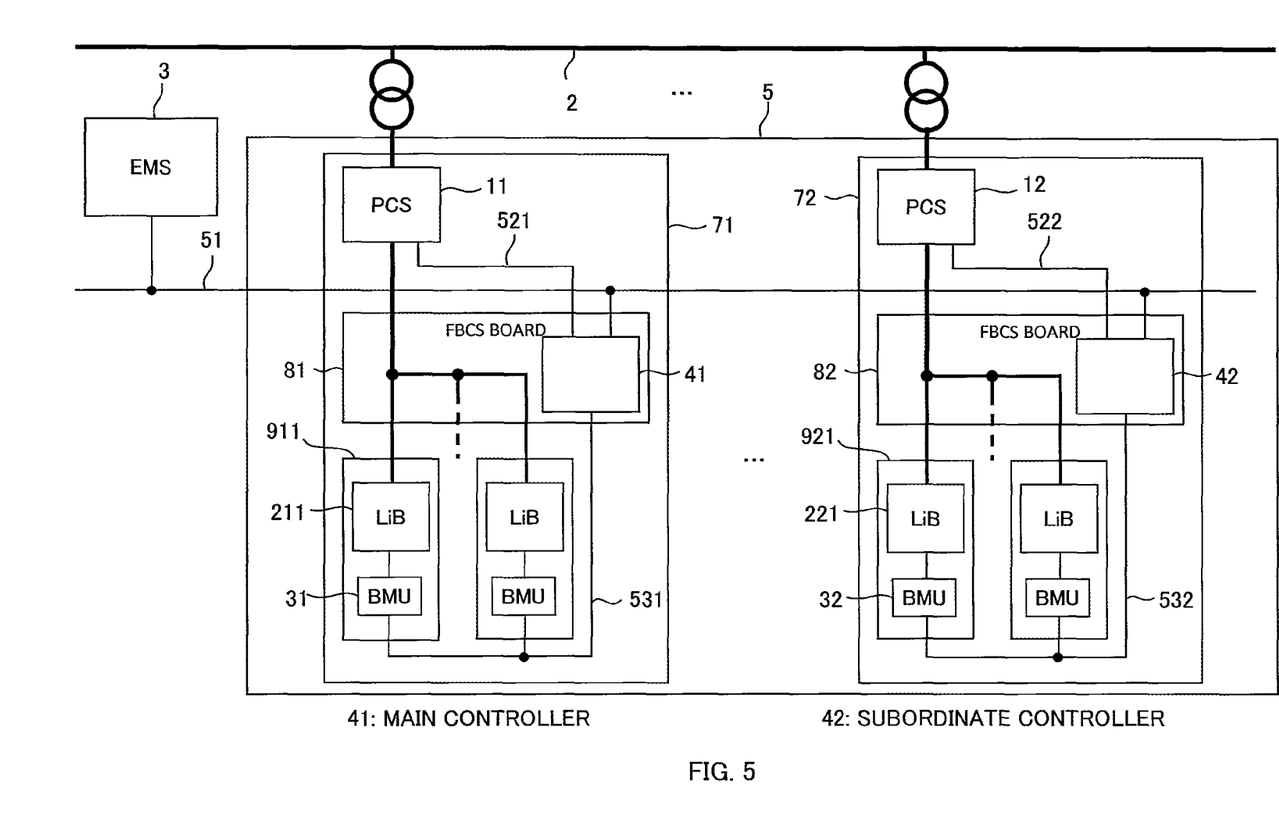
FIG. 5 is a conceptual configuration diagram for describing a modification of the system configuration relating to the embodiment 1 of the present invention.

Now, in the system configuration in FIG. 1, one controller 4 is arranged in the storage batteries, but the arrangement is not limited thereto. FIG. 5 is a conceptual configuration diagram for describing the modification of the system configuration relating to the embodiment 1 of the present invention. As illustrated in FIG. 5, one controller may be arranged in one PCS group. A main controller 41 illustrated in FIG. 5 receives the charge/discharge request from the EMS 3, receives the storage battery information from the first BMU 31, and receives the storage battery information transmitted by the second BMU 32 from a subordinate controller 42. The main controller 41 determines the charge/discharge commands for the individual PCSes using the SOC correction function and the charge/discharge command function described above. The main controller 41 transmits the charge/discharge command for the first PCS 11 to the first PCS 11, and transmits the charge/discharge command for the second PCS 12 to the subordinate controller 42. The subordinate controller 42 outputs the charge/discharge command for the second PCS 12 to the second PCS 12.

REFERENCE SIGNS LIST

1 Storage battery system
2 Power transmission facility
3 Energy management system (EMS)
4 Controller
6 SOC correction unit
7 Charge/discharge command unit
11 First power conditioning system (first PCS)
12 Second power conditioning system (second PCS)
21 First storage battery
22 Second storage battery
31 First battery management unit (first BMU)
32 Second battery management unit (second BMU)
41 Main controller
42 Subordinate controller
51, 52, 53 Computer network
211-213, 221-223 Storage battery module

The invention claimed is:

1. A storage battery system connected to a power system and operated on a basis of a charge/discharge request from an external energy management system that manages electric power supply/demand of the power system, comprising:
a first storage battery;
a second storage battery of a shorter service life than the first storage battery;
a first battery management unit that monitors a state of the first storage battery;
a second battery management unit that monitors a state of the second storage battery;
a first power conditioning system having a function of converting AC power of the power system to DC power and charging the DC power to the first storage battery, and a function of converting the DC power of the first storage battery to the AC power and discharging the AC power to the power system;
a second power conditioning system having a function of converting the AC power of the power system to the DC power and charging the DC power to the second storage battery, and a function of converting the DC power of the second storage battery to the AC power and discharging the AC power to the power system; and
a controller that receives the charge/discharge request and storage battery information supplied from the first and second battery management units, and controls the first and second power conditioning systems on the basis of the charge/discharge request and the storage battery information,
wherein the controller includes
an SOC calculator that
calculates actual SOCs (States Of Charge) of the first and second storage batteries on the basis of the storage battery information,
calculates a life-prolonging SOC of the second storage battery obtained by adding a positive value corresponding to a difference in service life of the first and second storage batteries to the actual SOC of the second storage battery in the case that the charge/discharge request is a charge request, and
calculates the life-prolonging SOC of the second storage battery obtained by adding a negative value corresponding to the difference in service life to the actual SOC of the second battery in the case that the charge/discharge request is a discharge request; and
a charge/discharge command unit that determines charge/discharge commands for the first and second power conditioning systems,
wherein the charge commands are determined so as to preferentially charge the first storage battery in the case that the charge/discharge request is the charge request and the actual SOC of the first storage battery is lower than the life-prolonging SOC of the second storage battery,
wherein the charge commands are determined so as to preferentially charge the second storage battery in the case that the charge/discharge request is the charge request and the life-prolonging SOC of the second storage battery is lower than the actual SOC of the first storage battery,
wherein the discharge commands are determined so as to preferentially discharge the first storage battery in the case that the charge/discharge request is the discharge request and the actual SOC of the first storage battery is higher than the life-prolonging SOC of the second storage battery, and
wherein the discharge commands are determined so as to preferentially discharge the second storage battery in the case that the charge/discharge request is the discharge request and the life-prolonging SOC of the second storage battery is higher than the actual SOC of the first storage battery.

* * * * *

UNITED STATES PATENT AND TRADEMARK OFFICE
CERTIFICATE OF CORRECTION

Page 1 of 1

PATENT NO. : 10,424,931 B2
APPLICATION NO. : 15/519755
DATED : September 24, 2019
INVENTOR(S) : Masato Hanada et al.

It is certified that error appears in the above-identified patent and that said Letters Patent is hereby corrected as shown below:

On the Title Page

Item (71), the Applicant's city of residence is incorrect. Item (71) should read:
-- (71) Applicant: TOSHIBA MITSUBISHI-ELECTRIC INDUSTRIAL SYSTEMS CORPORATION, Chuo-ku (JP) --

Signed and Sealed this
Seventh Day of January, 2020

Andrei Iancu
*Director of the United States Patent and Trademark Office*